United States Patent
Nakano et al.

(10) Patent No.: US 10,030,735 B2
(45) Date of Patent: Jul. 24, 2018

(54) PRESSURE DAMPING DEVICE

(71) Applicant: Showa Corporation, Gyoda (JP)

(72) Inventors: Gota Nakano, Gyoda (JP); Takashi Tsukahara, Gyoda (JP)

(73) Assignee: SHOWA CORPORATION, Gyoda (JP)

( * ) Notice: Subject to any disclaimer, the term of this patent is extended or adjusted under 35 U.S.C. 154(b) by 44 days.

(21) Appl. No.: 14/866,353

(22) Filed: Sep. 25, 2015

(65) Prior Publication Data

US 2016/0017950 A1    Jan. 21, 2016

Related U.S. Application Data

(63) Continuation of application No. PCT/JP2013/080108, filed on Nov. 7, 2013.

(30) Foreign Application Priority Data

Mar. 29, 2013   (JP) ................. 2013-074123

(51) Int. Cl.
*F16F 9/18* (2006.01)
*B60G 13/08* (2006.01)
(Continued)

(52) U.S. Cl.
CPC .............. *F16F 9/187* (2013.01); *B60G 13/08* (2013.01); *F16F 9/3257* (2013.01); *F16F 9/3415* (2013.01)

(58) Field of Classification Search
CPC ......... F16F 9/187; F16F 9/3415; F16F 9/3257
See application file for complete search history.

(56) References Cited

U.S. PATENT DOCUMENTS

| 4,070,895 A | 1/1978 | Yamada et al. |
| 5,143,185 A * | 9/1992 | Klein ............ F16F 9/465 188/266.5 |

(Continued)

FOREIGN PATENT DOCUMENTS

| CN | 1902073 A | 1/2007 |
| CN | 102652231 A | 8/2012 |

(Continued)

OTHER PUBLICATIONS

Office Action dated Apr. 15, 2016 for the corresponding Chinese Patent Application No. 201380075196.4.

(Continued)

*Primary Examiner* — Bradley T King
(74) *Attorney, Agent, or Firm* — Leason Ellis LLP

(57) ABSTRACT

A hydraulic damping device includes a cylinder 11, a cylinder 12, a piston 30 that partitions a space in the cylinder 11, a piston rod 20 that is connected to the piston 30, a bottom valve 40 that separates the interior of the cylinder 11 from a reservoir chamber R and has a communication passage of a liquid between the interior of the cylinder 11 and the reservoir chamber R, and a check valve mechanism 50 that is disposed in a radial direction of an area where movement of the piston 30 in the cylinder 11 is restricted or an area extended axially on an outer side of the cylinder 11, and permits a flow in one direction between the interior of the cylinder 11 and the reservoir chamber R caused by the movement of the piston 30 and restricts the flow in the other direction.

7 Claims, 10 Drawing Sheets

(51) Int. Cl.
*F16F 9/34* (2006.01)
*F16F 9/32* (2006.01)

(56) References Cited

U.S. PATENT DOCUMENTS

| | | | |
|---|---|---|---|
| 6,648,308 B2* | 11/2003 | Gunnar Rothoff | B60G 17/044 267/64.17 |
| 7,347,307 B2* | 3/2008 | Joly | F16F 9/46 188/266.5 |
| 8,794,406 B2* | 8/2014 | de Kock | F16F 9/062 188/315 |
| 8,973,726 B2* | 3/2015 | Tsukahara | F16F 9/19 188/315 |
| 2005/0056504 A1 | 3/2005 | Holiviers | |
| 2007/0000743 A1 | 1/2007 | Naitou et al. | |
| 2012/0001399 A1* | 1/2012 | Coombs | B60G 17/08 280/124.161 |
| 2012/0152671 A1* | 6/2012 | Murakami | F16F 9/187 188/315 |
| 2012/0247890 A1 | 10/2012 | Murakami | |
| 2013/0081912 A1 | 4/2013 | Murakami | |
| 2013/0264158 A1* | 10/2013 | Hall | F16F 9/187 188/313 |
| 2015/0152935 A1* | 6/2015 | Ogawa | F16F 9/48 188/313 |

FOREIGN PATENT DOCUMENTS

| | | |
|---|---|---|
| CN | 102734372 A | 10/2012 |
| GB | 2269437 A | 2/1994 |
| JP | 52-037550 A | 3/1977 |
| JP | 06-185563 A | 7/1994 |
| JP | 2005-214307 A | 8/2005 |
| JP | 2007-010010 A | 1/2007 |
| JP | 2008-298137 A | 12/2008 |
| JP | 2009-074562 A | 4/2009 |
| JP | 2011-247427 A | 12/2011 |
| JP | 2012-026549 A | 2/2012 |
| JP | 2012-207774 A | 10/2012 |

OTHER PUBLICATIONS

International Search Report dated Jan. 14, 2014 for the corresponding PCT Application No. PCT/JP2013/080108.
Office Action dated Jan. 10, 2017 for the corresponding Japanese Patent Application No. 2015-507941.
Office Action dated Aug. 8, 2017 for the corresponding Japanese Patent Application No. 2015-507941.

* cited by examiner

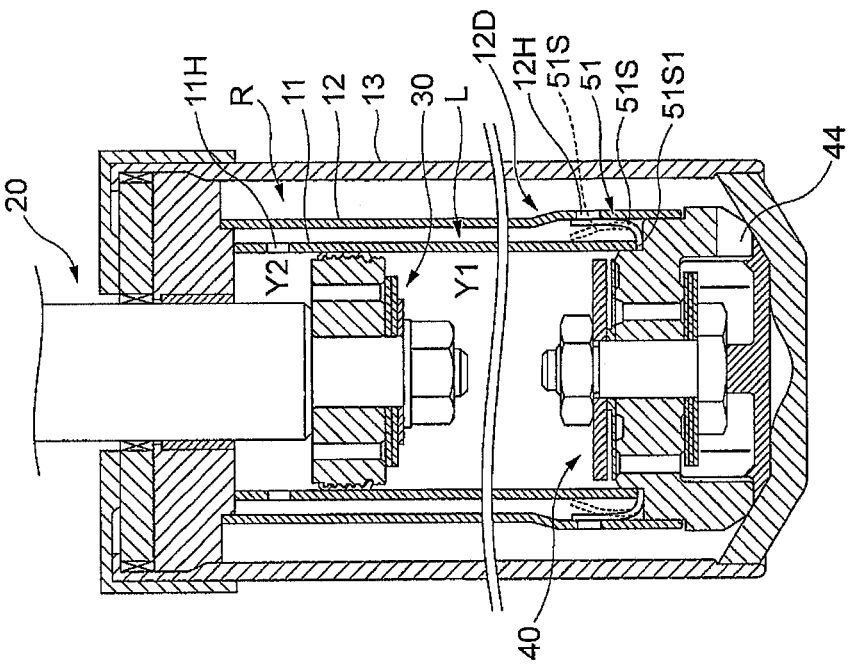
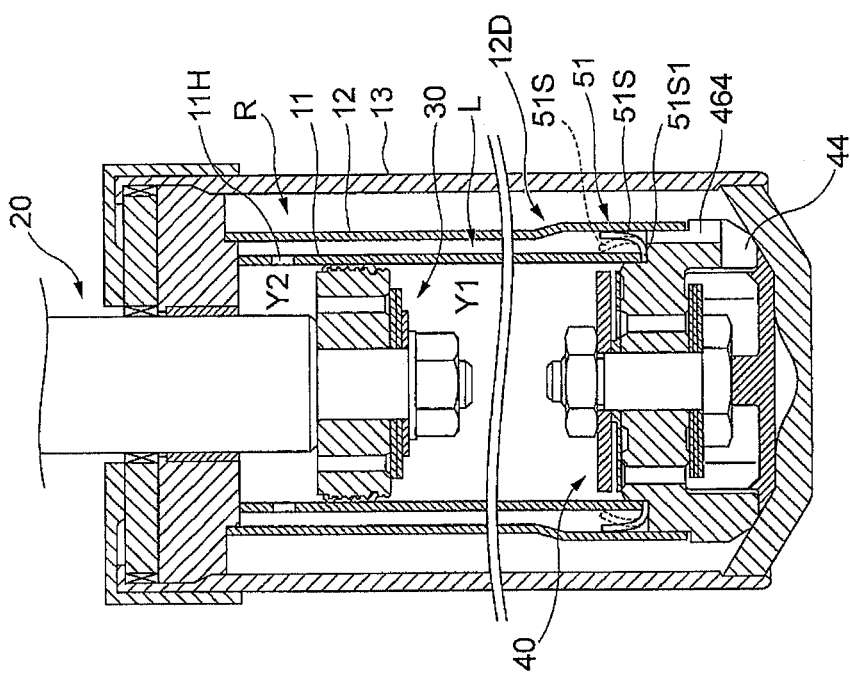

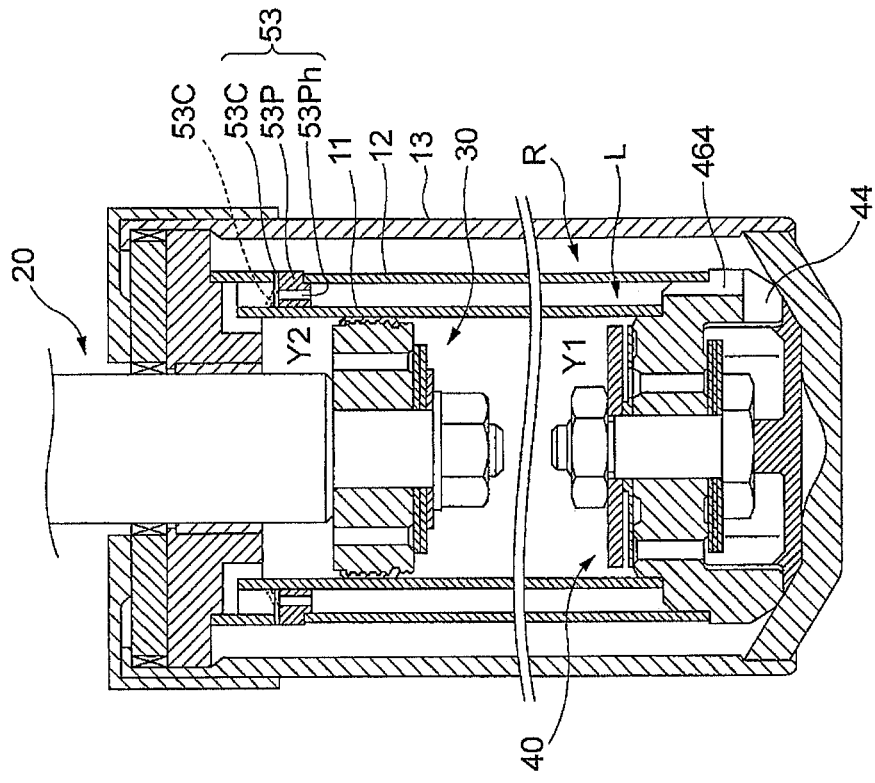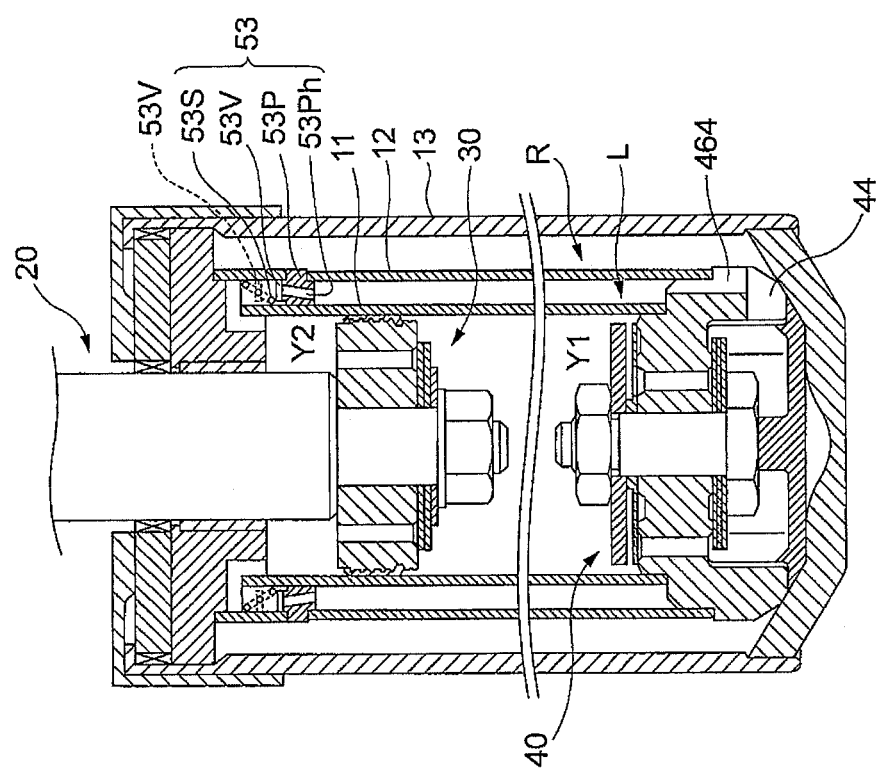

PRESSURE DAMPING DEVICE

CROSS REFERENCE TO RELATED APPLICATION

This is a continuation of International Application No. PCT/JP2013/080108 filed on Nov. 7, 2013, and claims priority from Japanese Patent Application No. 2013-074123, filed on Mar. 29, 2013, the entire disclosures of which are incorporated herein by reference.

BACKGROUND

1. Technical Field

The present invention relates to a pressure damping device.

2. Related Art

A suspension system of a vehicle such as an automobile or the like includes a pressure damping device that uses a damping force generator in order to appropriately damp vibrations transmitted from a road surface to a vehicle body during running to thereby improve ride quality and driving stability. The pressure damping device is provided with, e.g., a partition member that is provided movably in a cylinder and partitions the interior of the cylinder, a rod member that is connected to the partition member, and a damping force generation member that is provided in the cylinder, and gives resistance to the flow of a liquid caused by the movement of the partition member to thereby generate a damping force.

In addition, there is known the pressure damping device provided with a liquid reservoir portion. In the pressure damping device, the rod member advances into or retracts from the cylinder so that a liquid in the cylinder becomes excessive or deficient by the liquid having a volume corresponding to the volume of the rod member, and the liquid reservoir portion is provided in order to absorb or supply the liquid having the volume corresponding to the volume of the rod member.

The pressure damping device of this type includes, e.g., the cylinder, a piston that is slidably inserted into the cylinder and partitions the interior of the cylinder into a rod chamber and a piston chamber, a rod that is movably inserted into the cylinder and has one end coupled to the piston, a reservoir, an extension side damping flow path that permits a flow from the rod chamber to the piston chamber and gives resistance to the flow of a passing liquid, a compression side damping flow path that permits the flow from the piston chamber to the reservoir and gives resistance to the flow of the passing liquid, a piston chamber side suction flow path that permits only the flow from the reservoir to the piston chamber, and a rod chamber side suction flow path that permits only the flow from the reservoir to the rod chamber (e.g., see Patent Document 1 (JP-A-2009-074562)).

SUMMARY OF INVENTION

By the way, for example, because of the limitation of a layout in a place where the suspension system of the vehicle or the like is installed, it is requested to maximize the movement distance of the rod member to be secured while maintaining the predetermined length of the suspension system in an axial direction.

In view of above, illustrative aspect(s) of the present invention is to increase the stroke range of the rod member in the axial direction.

An aspect of the present invention provides a pressure damping device including a first cylinder containing a liquid, a second cylinder positioned outside the first cylinder and forming a liquid reservoir chamber in which the liquid collects between the second cylinder and the first cylinder, a partition member provided in the first cylinder so as to be movable in an axial direction and partitioning a space in the first cylinder into a first liquid chamber and a second liquid chamber that contain the liquid in the space in the first cylinder, a rod member connected to the partition member and moving in the axial direction of the first cylinder, a partition communication member separating the interior of the first cylinder from the liquid reservoir chamber and having a communication passage of the liquid between the space of the first cylinder and the liquid reservoir chamber, and a permission restriction portion disposed radially outside of either an area of the first cylinder where movement of the partition member is restricted, or an area obtained by axially extending the area of the first cylinder, and permitting a flow in one direction between the interior of the first cylinder and the liquid reservoir chamber caused by the movement of the partition member, and restricting a flow in the other direction.

Herein, the pressure damping device may further include an outer flow path forming a flow path of the liquid between the first liquid chamber and the liquid reservoir chamber outside the first cylinder, in which the partition communication member has a liquid reservoir portion communication passage that forms a flow path of the liquid between the outer flow path and the liquid reservoir chamber, and the permission restriction portion is provided in the liquid reservoir portion communication passage, and permit and restrict the flow of the liquid between the interior of the first cylinder and the liquid reservoir chamber via the outer flow path.

In addition, the pressure damping device may be characterized by further including an outer flow path forming a flow path of the liquid between the first liquid chamber and the liquid reservoir chamber outside the first cylinder, in which the permission restriction portion is provided in the outer flow path, and permit and restrict a flow of the liquid between the interior of the first cylinder and the liquid reservoir chamber via the outer flow path.

Further, The pressure damping device may further include a third cylinder provided between the first cylinder and the second cylinder, forming the outer flow path between the third cylinder and the first cylinder, and forming the liquid reservoir chamber between the third cylinder and the second cylinder, in which the partition member has an inter-liquid chamber communication passage that forms a flow path of the liquid between the first liquid chamber and the second liquid chamber, and a partition member restriction permission member that permits a flow of the liquid from the second liquid chamber to the first liquid chamber via the inter-liquid chamber communication passage and restricts a flow of the liquid from the first liquid chamber to the second liquid chamber, the permission restriction portion is configured by an elastic mechanism having an elastic body that receives the flow of the liquid and is thereby elastically deformed or a movable body that is moved by an elastic body that receives the flow of the liquid and is thereby elastically deformed, and the elastic mechanism may permit a flow of the liquid from the liquid reservoir chamber to the second liquid chamber via the outer flow path by opening the liquid reservoir portion communication passage in conjunction with movement of the partition member toward the first liquid chamber, and restrict a flow of the liquid from the second liquid chamber to the liquid reservoir chamber via the outer flow path by closing the liquid reservoir portion communication passage in conjunction with movement of the partition member toward the second liquid chamber.

According to the aspect of the present invention, it becomes possible to increase the stroke range of the rod member in the axial direction.

BRIEF DESCRIPTION OF DRAWINGS

FIGS. 5A and 5B are views for explaining a check valve mechanism of a first modification;

FIGS. 7A and 7B are views for explaining a check valve mechanism of a third modification;

DESCRIPTION OF EMBODIMENTS

Hereinbelow, an embodiment of the present invention will be described in detail with reference to the accompanying drawings.

Figure 1:
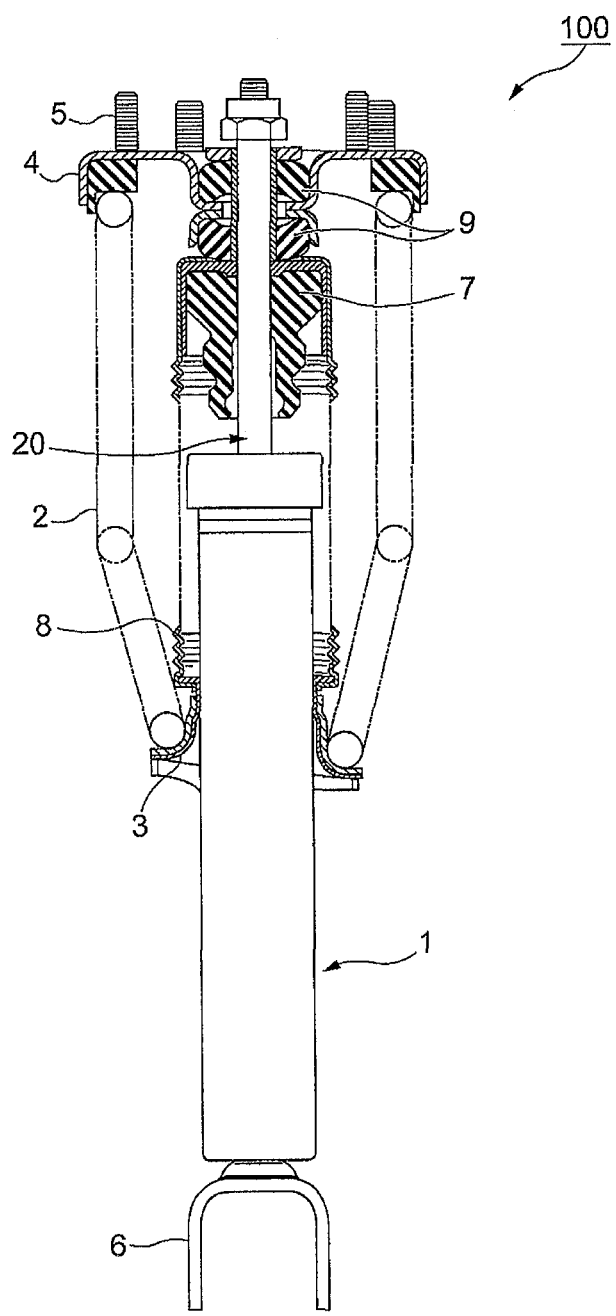
FIG. 1 is a view showing the schematic configuration of a suspension system of the present embodiment.

FIG. 1 is a view showing the schematic configuration of a suspension system 100 of the present embodiment.
[Configuration and Function of Suspension System 100]

As shown in FIG. 1, the suspension system 100 includes a hydraulic damping device 1, and coil springs 2 that are disposed outside the hydraulic damping device 1. In the suspension system 100, the coil springs 2 are held by spring seats 3 and spring seats 4 provided on both sides. The suspension system 100 includes bolts 5 for mounting to a vehicle body or the like and a wheel side mounting portion 6 provided in the lower portion of the hydraulic damping device 1.

In addition, the suspension system 100 includes a bump rubber 7 that is pressed into the outer periphery of a piston rod 20 described later that protrudes from the hydraulic damping device 1. Further, the suspension system 100 includes a bellows-like dust cover 8 that covers the end of a part of the hydraulic damping device 1 and the outer periphery of the piston rod 20 protruding from the hydraulic damping device 1. Furthermore, the suspension system 100 includes a plurality of (two in the present embodiment) mount rubbers 9 that are vertically disposed on the upper end side of the piston rod 20 and absorb vibrations.

Figure 2:
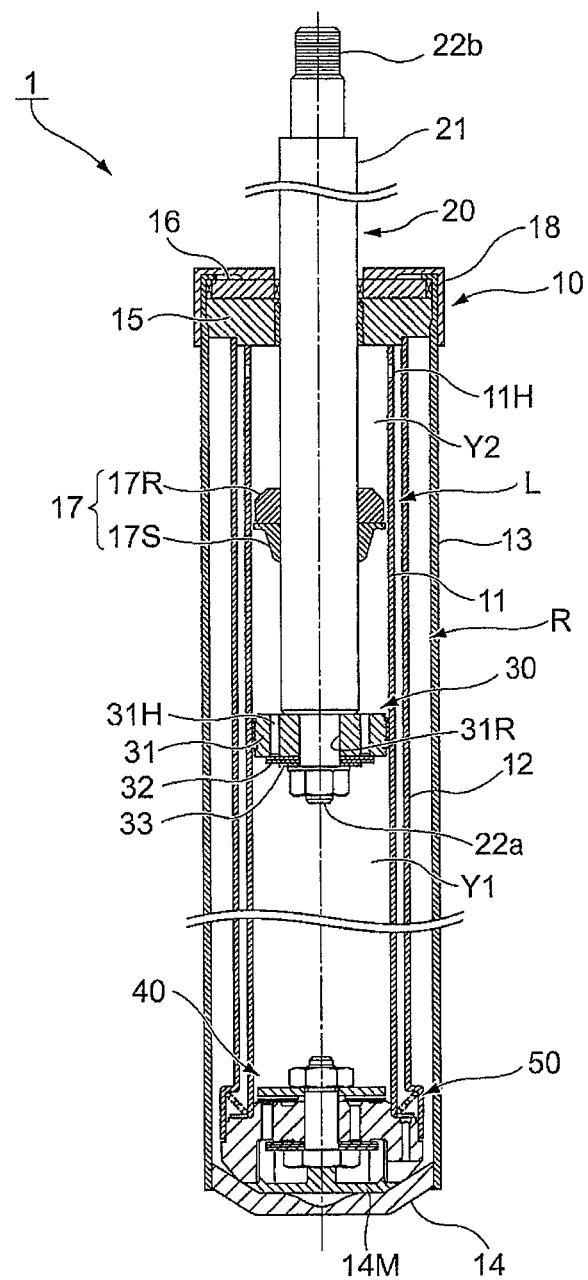
FIG. 2 is a view of the entire configuration of a hydraulic damping device of the present embodiment.

FIG. 2 is a view of the entire configuration of the hydraulic damping device 1 of the present embodiment.

Figure 3A:
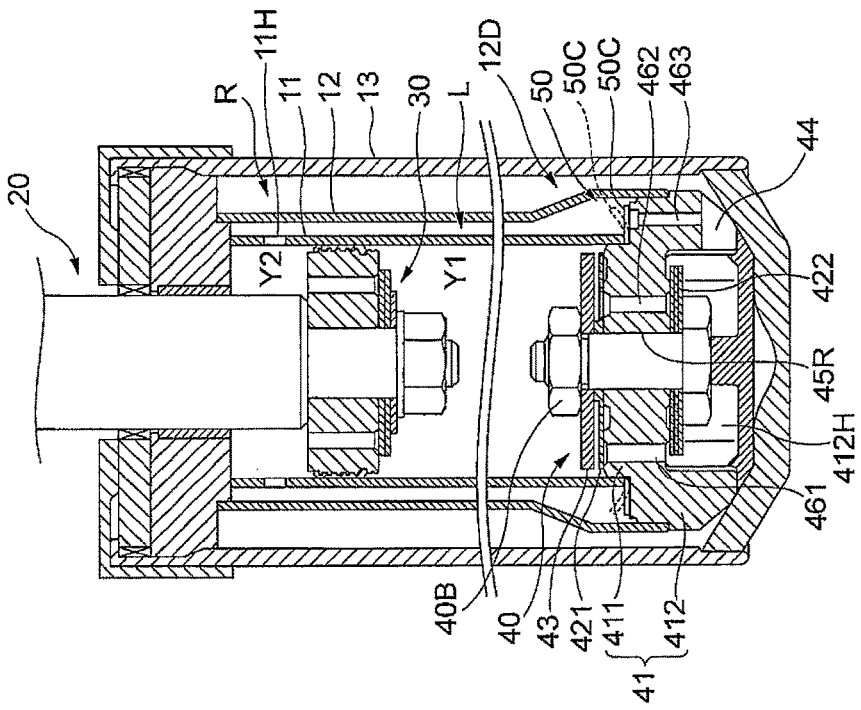
FIGS. 3A and 3B are views for explaining the hydraulic damping device in detail.
Figure 3B:
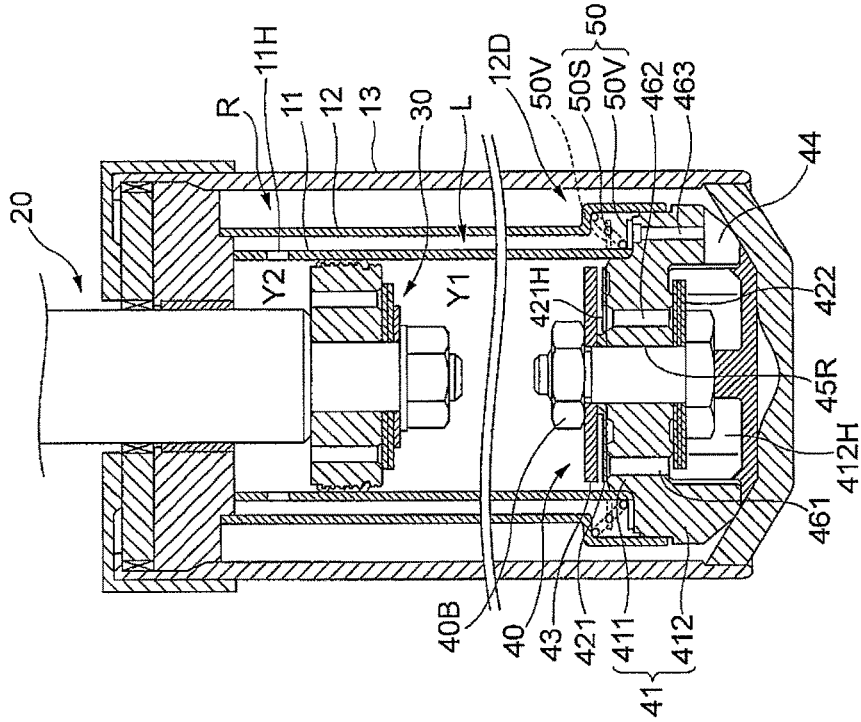

FIGS. 3A and 3B are views for explaining the hydraulic damping device 1 in detail.
[Configuration and Function of Hydraulic Damping Device 1]

As shown in FIG. 2, the hydraulic damping device 1 includes a cylinder portion 10, the piston rod 20 as an example of a rod member, a piston 30 as an example of a partition member, a bottom valve 40 as an example of a partition communication member, and a check valve mechanism 50 as an example of a permission restriction member.
(Configuration and Function of Cylinder Portion 10)

The cylinder portion 10 includes a cylinder 11 as an example of a first cylinder, an outer cylindrical body 12 as an example of a third cylinder that is provided outside the cylinder 11, and a damper case 13 as an example of a second cylinder that is provided outside the outer cylindrical body 12. The cylinder 11, the outer cylindrical body 12, and the damper case 13 are disposed concentrically (coaxially).

Note that, in the following description, the central axis direction of the cylinder of the damper case 13 is simply referred to as an "axial direction". In addition, the lower end side of the damper case 13 in the drawing in the axial direction is referred to as "one (side)", and the upper end side in the drawing in the axial direction of the damper case 13 is referred to as "the other (side)".

In addition, the cylinder portion 10 includes a bottom lid 14 that closes one end of the damper case 13 in the central axis direction (the vertical direction in FIG. 2), a rod guide 15 that guides the piston rod 20, and an oil seal 16 that prevents the leakage of oil in the cylinder portion 10 and the entry of a foreign object into the cylinder portion 10.

Further, the cylinder portion 10 includes a rebound stopper 17 that restricts the movement range of the piston rod 20, and a bump stopper cap 18 that is mounted to the other end of the damper case 13 in the axial direction.

The cylinder 11 (the first cylinder) is a thin cylindrical member. The oil as an example of a liquid is contained inside the cylinder 11. The piston 30 is provided so as to be slidable in the axial direction on the inner peripheral surface of the cylinder 11, and the outer periphery of the piston 30 moves while being in contact with the inner periphery of the cylinder 11. The piston 30 and a part of the piston rod 20 are movably disposed inside the cylinder 11.

In addition, the cylinder 11 includes a cylinder opening 11H that serves as a path in which the oil flows between the cylinder 11 and a communication passage L described later at a position on the other end side that is closer to one side than the rod guide 15.

The outer cylindrical body 12 (the third cylinder) is a thin cylindrical member. The outer cylindrical body 12 is provided outside the cylinder 11 and inside the damper case 13. The outer cylindrical body 12 is disposed such that the inner periphery of the outer cylindrical body 12 has a predetermined distance to the outer periphery of the cylinder 11. The outer cylindrical body 12 forms the communication passage L as an example of an outer flow path serving as the path of the oil between the interior of the cylinder 11 and a reservoir chamber R described later between the outer cylindrical body 12 and the cylinder 11.

As shown in FIGS. 3A and 3B, the outer cylindrical body 12 has an enlarged diameter portion 12D of which the inner diameter is larger than that on the other side at one end. In the enlarged diameter portion 12D, the distance to the cylinder 11 is longer than that in the other portion.

The damper case 13 (the second cylinder) is formed to be longer than the cylinder 11 and the outer cylindrical body 12. The damper case 13 stores the cylinder 11 and the outer cylindrical body 12 inside thereof in the axial direction and a circumferential direction. In addition, the damper case 13 is disposed such that the inner periphery thereof has a predetermined distance to the outer periphery of the outer cylindrical body 12. Between the damper case 13 and the outer cylindrical body 12, the reservoir chamber R (a liquid reservoir chamber) is formed, which absorbs the oil having a volume corresponding to the movement of advance or retraction of the piston rod 20 in the cylinder 11 and supplies the oil having the volume corresponding thereto into the cylinder 11.

The bottom lid 14 is mounted to one end of the damper case 13 and closes one end of the damper case 13. In addition, the bottom lid 14 supports the bottom valve 40 via a mount 14M, and supports the cylinder 11 and the outer cylindrical body 12 at one end of the damper case 13 in the axial direction via the bottom valve 40.

The rod guide 15 is a member having a substantially thick cylindrical shape, and is held by the damper case 13 on the inner periphery of the damper case 13. In addition, the rod guide 15 is fixed in the axial direction at the other end of the damper case 13 via the oil seal 16 positioned closer to the other end side than the rod guide 15.

The rod guide 15 holds the piston rod 20 in, e.g., an inside hole via a bush or the like, and supports the piston rod 20 such that the piston rod 20 is movable.

Further, the rod guide 15 closes the other ends of the cylinder 11 and the outer cylindrical body 12 in the axial direction on the inner side of the damper case 13 in a radial direction.

The oil seal 16 is a member in a substantially thick cylindrical shape, and is fixed to a seaming portion formed at the other end of the damper case 13. Note that the oil seal 16 allows the piston rod 20 to move in the axial direction in a hole provided inside the oil seat 16.

In addition, the oil seat 16 supports the cylinder 11 and the outer cylindrical body 12 at the other end of the damper case 13 in the axial direction via the rod guide 15.

The rebound stopper 17 includes a rebound seat 17S and a rebound rubber 17R.

The rebound seat 17S is a cylindrical member, and is fixed to the outer periphery of the piston rod 20 (by, e.g., welding or swaging). The rebound rubber 17R is a cylindrical member, and moves with the piston rod 20 inside the cylinder 11 in which the oil is sealed. The rebound rubber 17R is disposed between the rod guide 15 and the rebound seat 17S in a center line direction. In FIG. 2, the rebound rubber 17R is provided so as to be in contact with the rebound seat 17S.

The rebound stopper 17 restricts the movement of the piston rod 20 of a predetermined distance or more toward the other side in the axial direction during the extension stroke of the suspension system 100.

The bump stopper cap 18 is provided so as to cover the outside of the damper case 13 at the other end of the damper case 13. The bump stopper cap 18 protects the other end of the hydraulic damping device 1 at the time of collision of the bump rubber 7 during the compression stroke of the suspension system 100.

(Configuration and Function of Piston Rod 20)

The piston rod 20 extends in the axial direction, and is connected to the piston 30 at one end of the piston rod 20 in the axial direction.

The piston rod 20 is a solid or hollow bar-like member, and has a columnar or cylindrical rod portion 21, a one side mounting portion 22a for mounting the piston 30 to one end in the axial direction, and the other side mounting portion 22b for mounting the piston rod 20 to the vehicle body or the like at the other end in the axial direction. The outer surface of the end of each of the one side mounting portion 22a and the other side mounting portion 22b is spirally threaded and a male screw is thereby formed, and each of the one side mounting portion 22a and the other side mounting portion 22b functions as a bolt.

(Configuration and Function of Piston 30)

As shown in FIG. 2, the piston 30 includes a piston body 31, a valve group 32 that is provided on one end side of the piston body 31 in the axial direction, and a valve stopper 33 that is provided between the valve group 32 and a nut connected to the bolt of the one side mounting portion 22a of the piston rod.

The piston 30 is provided so as to be movable in the axial direction in the cylinder 11, and partitions the space in the cylinder 11 into a first liquid chamber and a second liquid chamber that contain the liquid.

The piston body 31 has a mounting hole 31R that is formed in the axial direction in order to allow the one side mounting portion 22a of the piston rod 20 to pass therethrough and oil paths 31H that are formed in the axial direction in portions on the outer side of the mounting hole 31R in the radial direction. A plurality of (four in the present embodiment) the oil paths 31H are formed at regular intervals in the circumferential direction, and constitute the paths in which the oil flows via the piston body 31.

The valve group 32 is a disc-like member formed with a bolt hole through which the one side mounting portion 22a of the piston rod 20 passes, and is constituted by stacking a plurality of disc-like members on each other. The individual valves that constitute the valve group 32 are provided at one end of the piston body 31, and are mounted so as to close one sides of the oil paths 31H.

The valve stopper 33 is in a thick cylindrical shape. The outer diameter of the valve stopper 33 is formed to be smaller than a radial distance from the center of the piston body 31 to the position where the oil path 31H is formed. The valve stopper 33 is positioned at the other end of the valve group 32 and pushes the valve group 32 toward the piston body 31.

(Configuration and Function of Bottom Valve 40)

As shown in FIG. 3A, the bottom valve 40 includes a valve body 41 that has a plurality of oil paths formed in the axial direction, a first valve 421 that closes one ends of a part of the oil paths in the axial direction that are formed in the valve body 41, a second valve 422 that closes the other ends of a part of the oil paths in the axial direction that are formed in the valve body 41, a valve stopper 43 that holds the second valve 422, and a bolt 40B that fixes these members.

The valve body 41 has a disc-like portion 411 and a cylindrical portion 412 that extends in the axial direction from the outermost portion of the disc-like portion 411 in the radial direction. The valve body 41 separates a first oil chamber Y1 from the reservoir chamber R.

The disc-like portion 411 is provided with a bolt hole 45R that is formed in the axial direction in order to allow the shaft portion of the bolt 40B to pass therethrough, a second oil path 462 that is formed in the axial direction at a portion on the outer side of the bolt hole 45R in the radial direction, a first oil path 461 that is formed in the axial direction at a portion on the outer side of the second oil path 462 in the radial direction, and a third oil path 463 as an example of a liquid reservoir portion communication passage that is formed in the axial direction at a portion on the outer side of the first oil path 461 in the radial direction.

A plurality of (four in the present embodiment) the first oil paths 461 and a plurality of (four in the present embodiment) the second oil paths 462 are formed at regular intervals in the circumferential direction, and function as communication passages that allow the first oil chamber Y1 and the reservoir chamber R to communicate with each other. The third oil path 463 allows the communication passage L and the reservoir chamber R to communicate with each other. Note that the third oil path 463 will be described later in detail.

The cylindrical portion 412 forms a space 412H inside the cylinder, and has a plurality of (four in the present embodiment (not shown)) concave portions 44 that are depressed from the end surface and are disposed at regular intervals in the circumferential direction on one end side in the axial direction. With the concave portions 44, the interior of the cylindrical portion 412 and the reservoir chamber R communicate with each other.

The first valve 421 is a disc-like member formed with a bolt hole through which the shaft portion of the bolt 40B passes. In addition, the first valve 421 has an outer diameter that allows closing of the other end of the second oil path 462, and is formed with a plurality of (nine in the present embodiment (not shown)) oil holes 421H that are disposed at regular intervals in the circumferential direction at positions corresponding to the first oil paths 461 when viewed from the center in the radial direction.

The second valve 422 is a disc-like member formed with a bolt hole through which the shaft portion of the bolt 40B passes. In addition, the second valve 422 has an outer diameter that allows closing of one end of the second oil path 462. The second valve 422 is mounted to the valve body 41 via the valve stopper 43 with a gap provided between the second valve 422 and the valve stopper 43.

(Configuration and Function of Check Valve Mechanism 50)

As shown in FIG. 3A, in the present embodiment, the check valve mechanism 50 includes a lift valve 50V as an example of a movable body and a spring 50S as an example of an elastic member. In addition, in the present embodiment, the check valve mechanism 50 is disposed on the outer side of an area obtained by extending the course of the piston 30. More specifically, the check valve mechanism 50 is positioned on the outer side of the cylinder 11 that forms the course of the piston 30 in the radial direction or on the outer side of the area obtained by axially extending the cylinder 11 in the radial direction.

Note that the course of the piston 30 is a constant path along which the piston 30 moves from the position as one end of the axial movement of the piston 30 to the position as the other end of the axial movement of the piston 30. In the present embodiment, the piston 30 is in a substantially columnar shape. Consequently, the course of the piston 30 has the columnar shape, and the outer diameter of the columnar shape corresponds to the outer diameter of the piston 30. In addition, the area obtained by extending the course corresponds to a virtual area obtained by extending the course outwardly in the axial direction along the direction of the course of the piston 30.

The lift valve 50V is a disc-like member having an opening in the inside thereof. The inner diameter of the lift valve 50V is formed to be larger than the outer diameter of the cylinder 11, and the outer diameter thereof is formed to be smaller than the inner diameter of the enlarged diameter portion 12D of the outer cylindrical body 12. The lift valve 50V is provided between the cylinder 11 and the outer cylindrical body 12 so as to be movable in the axial direction in a portion formed with the enlarged diameter portion 12D.

In addition, the lift valve 50V opposes the other end of the third oil path 463 formed in the valve body 41, and closes the third oil path 463 while being in contact with the valve body 41.

The spring 50S is mounted so as to be in contact with the lift valve 50V in one of expansion and contraction directions (the axial direction), and be hooked by the corner of the enlarged diameter portion 12D in the other one of the expansion and contraction directions. The spring 50S pushes the lift valve 50V against the side of the other end of the third oil path 463 of the valve body 41.

The spring force of the spring 50S is set such that, when a flow from the reservoir chamber R toward the communication passage L via the third oil path 463 occurs as will be described later, the spring 50S can contract with the flow. In addition, an example of the spring 50S includes a coil spring, but various members can be used as the spring 50S as long as the members are elastically deformable members such as a wave washer, a disc spring, and a plate spring.

As described above, the check valve mechanism 50 causes the lift valve 50V to advance or retract relative to one end of the third oil path 463 of the valve body 41 with the elastic force of the spring 50S using the lift valve 50V and the spring 50S.

Herein, a configuration may also be adopted in which the check valve mechanism 50 causes the lift valve 50V to advance or retract relative to one end of the third oil path 463 with deformation and restoration from a deformed state in accordance with the flow of the oil.

As shown in FIG. 3B, as an example of the elastic body, a check valve 50C may also be used. The check valve 50C is a disc-like member having an opening in the inside thereof, and can be deformed by the resistance of the oil. The inner diameter of the check valve 50C is formed to be smaller than the outer diameter of the cylinder 11, and is formed to be larger than the inner diameter of the cylinder 11. In addition, the check valve 50C is set to be smaller than the inner diameter of the enlarged diameter portion 12D of the outer cylindrical body 12. That is, in a mounted state, the inner peripheral portion of the check valve 50C is sandwiched between one end of the cylinder 11 and the other side of the valve body 41. In addition, the check valve 50C is configured to be deformable while the outer peripheral side thereof is not held, and the check valve 50C covers one end of the third oil path 463 while being in contact with the valve body 41.

Note that the piston 30 moves in the axial direction in the inner periphery of the cylinder 11. The lift valve 50V and the check valve 50C are provided on the outer side of the cylinder 11 in the radial direction. Consequently, the lift valve 50V and the check valve 50C are disposed on the outer side of the course of the piston 30.

As described above, the check valve mechanism 50 shown in each of FIGS. 3A and 3B is configured to open or close the third oil path 463 by causing the lift valve 50V or the check valve 50C provided in the valve body 41 to advance or retract relative to the third oil path 463 formed in the valve body 41. With this, it is possible to form the check valve mechanism 50 for controlling the flow of the oil in the reservoir chamber R and the cylinder 11 via the communication passage L integrally with the bottom valve 40. Accordingly, it is possible to simultaneously form the check valve mechanism 50 by mounting the bottom valve 40, and hence it is possible to improve assembly of the device.

In addition, as the relationship between the third oil path 463 and the lift valve 50V or the check valve 50C, it is possible to provide the flow path and the member for opening and closing the flow path in the bottom valve 40 as a single member, and hence it is possible to increase reliability and improve the assembly at the time of manufacturing, and it becomes possible to further reduce manufacturing cost.

[Operation of Hydraulic Damping Device 1]

Figure 4A:
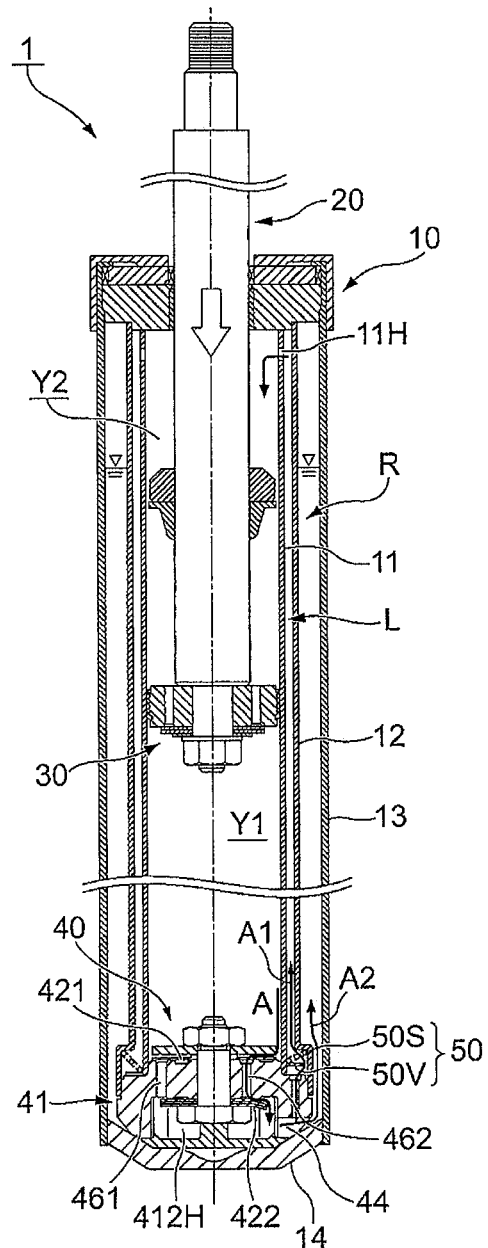
FIGS. 4A and 4B are views for explaining the operation of the hydraulic damping device.
Figure 4B:
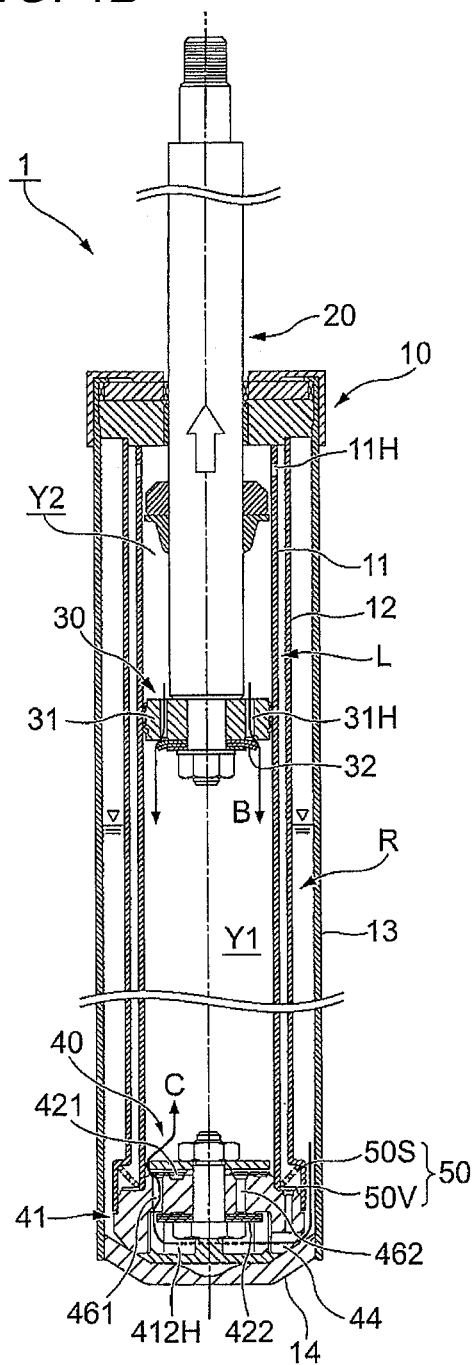

FIGS. 4A and 4B are views for explaining the operation of the hydraulic damping device 1.

First, the flow of the oil during the compression stroke of the hydraulic damping device 1 will be described.

FIG. 4A is a view showing the flow of the oil during the compression stroke, and FIG. 4B is a view showing the flow of the oil during the extension stroke. Note that, in the following description, the description will be given by using the check valve mechanism 50 described with reference to FIGS. 1 and 3A as an example.

As shown in FIG. 4A, when the piston 30 moves to one end side (downward in FIG. 4A) in the axial direction relative to the cylinder portion 10 as indicated by an open arrow, the oil in the first oil chamber Y1 is pushed with the movement of the piston 30, and the pressure in the first oil chamber Y1 is increased. Note that, at this point, the pressure in the second oil chamber Y2 positioned on the other side relative to the first oil chamber Y1 positioned on one side of the piston 30 is reduced, and hence the valve group 32 keeps closing the oil path 31H.

Subsequently, the pressure in the first oil chamber Y1 that is increased with the movement of the piston 30 to one end side in the axial direction acts on the second oil path 462 of the bottom valve 40, and opens the second valve 422 that closes the second oil path 462. Then, as indicated by an arrow A of FIG. 4A, the oil in the first oil chamber Y1 flows to the space 412H of the valve body 41 through the second oil path 462 of the valve body 41.

Subsequently, the flow of the oil from the first oil chamber Y1 to the reservoir chamber R is narrowed by the second valve 422 and the second oil path 462, and a damping force during the compression stroke of the hydraulic damping device 1 is obtained.

With the movement of the piston 30 to one end side in the axial direction, the pressure in the second oil chamber Y2 is reduced, and the pressure on one side of the valve body 41 becomes relatively high with the flow of the oil indicated by the arrow A, as described above. Accordingly, the pressure that is increased on one side of the valve body 41 acts on the third oil path 463 of the valve body 41, and the lift valve 50V that closes the third oil path 463 moves away from the other end of the third oil path 463 against the spring force of the spring 50S. As a result, as indicated by an arrow A1, the flow of the oil in the communication passage L is generated, and the oil flows into the second oil chamber Y2.

Further, so as to compensate for the oil having a volume corresponding to the movement of the piston rod 20 in one direction, as indicated by an arrow A2, the oil flows into the reservoir chamber R formed between the outer cylindrical body 12 and the damper case 13 through the concave portion 44 from one side of the valve body 41.

Next, the flow of the oil during the extension stroke of the hydraulic damping device 1 will be described.

As shown in FIG. 4B, when the piston 30 moves to the other end side (upward in FIG. 4B) in the axial direction relative to the cylinder 10 as indicated by an open arrow, the pressure in the first oil chamber Y1 becomes negative due to the deficiency of the oil corresponding to the volume of the movement in the first oil chamber Y1. With this, the oil in the second oil chamber Y2 runs through the oil path 31H of the piston body 31, opens the valve group 32 that closes the oil path 31H, and flows into the first oil chamber Y1, as indicated by an arrow B of FIG. 4B.

The flow of the oil from the second oil chamber Y2 to the first oil chamber Y1 is narrowed by the valve group 32 and the oil path 31H, and the damping force during the extension stroke of the hydraulic damping device 1 is obtained.

In addition, when the piston 30 moves in the direction of the open arrow of FIG. 4B, the pressure of the oil in the first oil chamber Y1 is reduced and the pressure on one side of the bottom valve 40 becomes relatively high. The pressure in the space 412H of the bottom valve 40 acts on the first oil path 461, and the first valve 421 that closes the first oil path 461 is opened. Subsequently, the oil in the reservoir chamber R runs through the concave portion 44 of the valve body 41 and flows as indicated by an arrow C of FIG. 4B.

The flow of the oil from the reservoir chamber R to the first oil chamber Y1 is narrowed by the first valve 421 and the first oil path 461 of the bottom valve 40, and the damping force during the extension stroke of the hydraulic damping device 1 is obtained.

In addition, with the movement of the piston 30 in the other direction, the pressure in the second oil chamber Y2 is increased and the oil is to flow from the second oil chamber Y2 toward the reservoir chamber R via the communication passage L, but the flow is restricted by the check valve mechanism 50. That is, the pressure in the communication passage L is increased with an increase in the pressure in the second oil chamber Y2, but the pressure on one side of the valve body 41 is relatively low. Consequently, the lift valve 50V positioned at the other end of the third oil path 463 formed in the valve body 41 keeps closing the third oil path 463, and the flow of the oil toward the reservoir chamber R via the third oil path 463 is restricted.

In the above-described hydraulic damping device 1, the check valve mechanism 50 is disposed on the outer side of the cylinder 11 in the radial direction. Accordingly, the check valve mechanism 50 does not obstruct the movement of the piston 30. Consequently, it is possible to secure the axial stroke length of the piston 30 and the piston rod 20 connected to the piston 30 that is longer than the stroke length of the hydraulic damping device of the conventional art.

That is, in the hydraulic damping device of the conventional art, in order to provide the mechanism of the check valve that controls the flow of the oil between, e.g., the reservoir chamber R and the first oil chamber Y1, a configuration is adopted in which a piece formed with the oil path is provided at a position closer to one side in the axial direction than the bottom valve 40, and the valve member is provided so as to close the oil path of the piece. In this case, it is necessary to shorten the course as the axial length of movement of the piston 30 and the piston rod 20 correspondingly to the axial length of the piece and the axial length of the valve member, or increase the entire length of the hydraulic damping device 1 in order to secure the course of the piston rod 20.

In contrast to this, in the hydraulic damping device 1 of the present embodiment, since the check valve mechanism 50 is disposed on the outer side of the course of the piston 30 or the area obtained by extending the course of the piston 30 by positioning the check valve mechanism 50 on the outer side of the cylinder 11 in the radial direction, it is possible to secure the long stroke length of the piston rod 20.

(Configuration and Function of Check Valve Mechanism 51 of First Modification)

FIGS. 5A and 5B are views for explaining a check valve mechanism 51 of a first modification.

Note that, in the following description, members similar to those in the above embodiment are designated by the same reference numerals and the detailed description thereof will be omitted.

The bottom valve 40 to which the check valve mechanism 51 of the first modification is applied has a outer flow path formation portion 464 that is a portion having the outer diameter smaller than the inner diameter of the outer cylindrical body 12 and forms a path for flowing the oil between the valve body 41 and the outer cylindrical body 12 at a part of the valve body 41.

The outer flow path formation portion 464 opposes the concave portion 44 on one side in the axial direction, and opposes the communication passage L on the other side in the axial direction. The outer flow path formation section 464 constitutes the path in which the oil flows between the communication passage L and reservoir chamber R.

The check valve mechanism 51 of the first modification has an oil seal 51S. The oil seal 51S is a disc-like member having an opening portion 51S1 in the inside thereof, and is formed of a deformable material such as rubber or the like. In the oil seal 51S, the inner diameter of the opening portion 51S1 is larger than the inner diameter of the cylinder 11, and is smaller than the outer diameter of the cylinder 11. In addition, the outer diameter of the oil seal 51S is formed to be larger than the inner diameter of the outer cylindrical body 12. Further, the opening portion 51S1 of the oil seal 51S is held by the valve body 41. Furthermore, the oil seal 51S is sandwiched between the valve body 41 and one end of the cylinder 11.

In the thus configured check valve mechanism 51 as well, the flow of the oil from the reservoir chamber R to the second oil chamber Y2 is permitted during the compression stroke, and the flow of the oil from the second oil chamber Y2 to the reservoir chamber R is restricted during the extension stroke. In addition, in the check valve mechanism 51, the oil seal 51S is disposed on the outer side of the cylinder 11 in the radial direction and is positioned on the outer side of the course of the piston 30 or the area obtained by extending the course thereof, and hence the long stroke length of the piston rod 20 is secured.

As described above, the flow path connected to the reservoir chamber R may also be formed between the bottom valve 40 and the outer cylindrical body 12 instead of forming the flow path connected to the reservoir chamber R by using, e.g., only the bottom valve 40. In addition, the oil seal 51S may be provided in order to control the flow of the oil in the flow path.

Further, as shown in FIG. 5B, instead of forming the flow path between the communication passage L and the reservoir chamber R in the bottom valve 40, the flow path between the communication passage L and the reservoir chamber R may be formed by forming a communication opening 12H in the outer cylindrical body 12. In this case, as shown in FIG. 5B, the outer diameter of the oil seal 51S may be appropriately set to have a length that allows the oil seal 51S to cover the communication opening 12H formed in the outer cylindrical body 12.

(Configuration and Function of Check Valve Mechanism 52 of Second Modification)

Figure 6A:
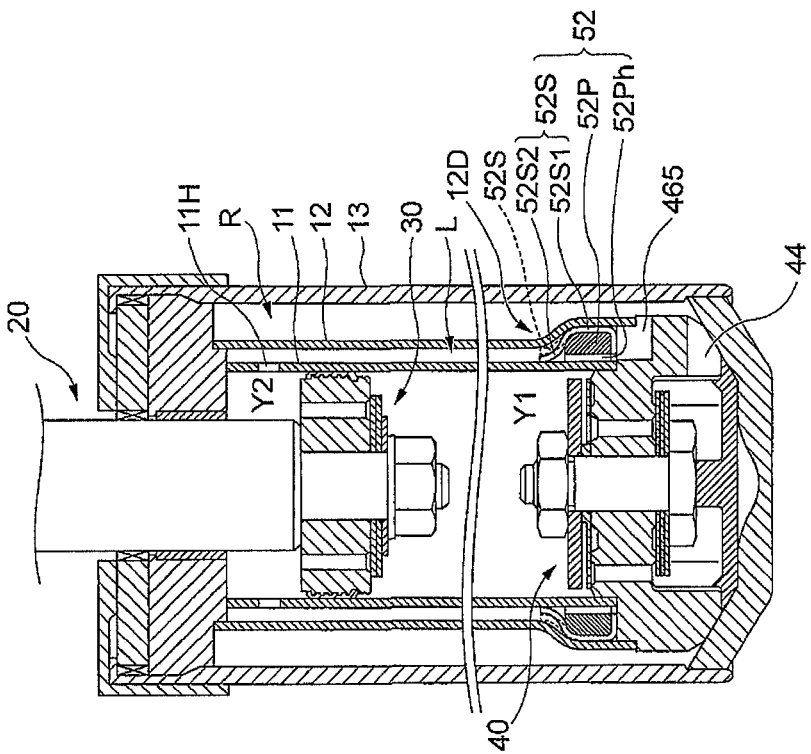
FIGS. 6A and 6B are views for explaining a check valve mechanism of a second modification.
Figure 6B:
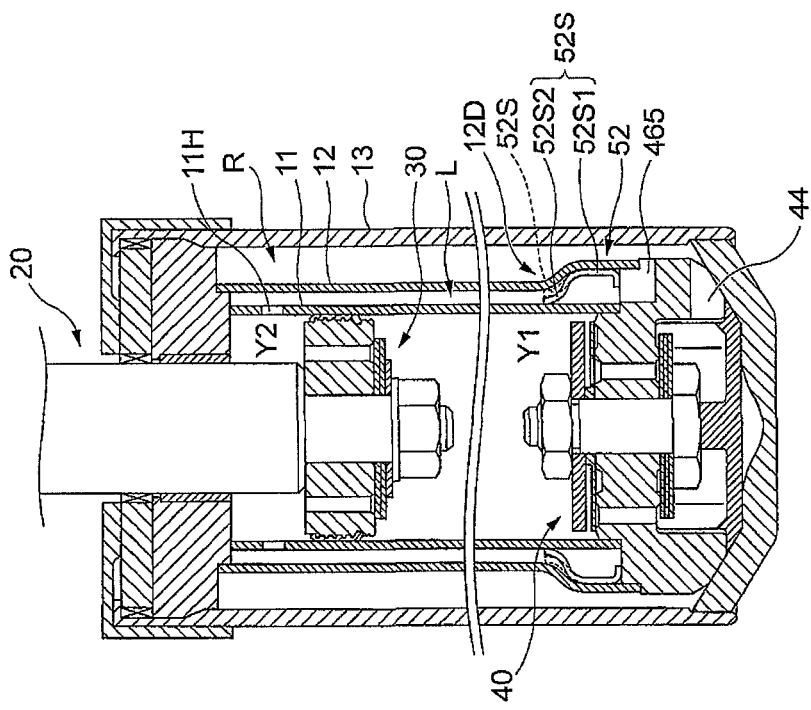

FIGS. 6A and 6B are views for explaining a check valve mechanism 52 of a second modification.

As shown in FIG. 6A, the check valve mechanism 52 of the second modification controls the flow of the oil to and from the reservoir chamber R by using an oil seal 52S provided on the outer cylindrical body 12.

The outer cylindrical body 12 to which the second modification is applied has the enlarged diameter portion 12D in which the inner diameter is increased at the end on one side. In addition, the valve body 41 has an opening portion 465 that opposes the communication passage L and the reservoir chamber R in the outer peripheral portion thereof.

As shown in FIG. 6A, the oil seal 52S is provided on the inner surface of the outer cylindrical body 12 at the enlarged diameter portion 12D. The oil seal 52S has a thin cylindrical shape, and is formed of a deformable material such as rubber or the like. The oil seal 52S is freely configured such that a connection portion 52S1 in the axial direction of the cylinder is adhered to the inner surface of the outer cylindrical body 12, and a deformation portion 52S2 can be deformed in accordance with the flow of the oil.

In the thus configured check valve mechanism 52 of the second modification, during the compression stroke, the deformation portion 52S2 approaches the inner periphery of the outer cylindrical body 12, and the flow of the oil from the reservoir chamber R to the second oil chamber Y2 is thereby permitted. On the other hand, during the extension stroke, the deformation portion 52S2 falls to the outer peripheral side of the cylinder 11 and comes into contact with the cylinder 11, and the flow of the oil from the second oil chamber Y2 to the reservoir chamber R is thereby restricted.

In addition, in the check valve mechanism 52 of the second modification as well, the oil seal 52S is disposed on the outer side of the cylinder 11 in the radial direction and is positioned on the outer side of the course of the piston 30 or the area obtained by extending the course thereof, and hence the long stroke length of the piston rod 20 is secured.

Note that, as shown in FIG. 6B, in order to cause the oil seal 52S to operate stably, a holding piece 52P may be provided. The holding piece 52P is a member having a thick cylindrical shape, and the holding piece 52P is mounted to the inner periphery of the enlarged diameter portion 12D with the oil seal 52S sandwiched between the holding piece 52P and the enlarged diameter portion 12D on the outer peripheral side, and has a ring oil path 52Ph serving as the path in which the oil flows on the inner peripheral side.

In addition, as shown in FIG. 6B, the connection portion 52S1 of the oil seal 52S is held on the inner periphery of the outer cylindrical body 12 by the holding piece 52P. During the extension stroke, in the oil seal 52S, the connection portion 52S1 is supported by the holding piece 52P, and the deformation portion 52S2 comes in contact with the holding piece 52P along the holding piece 52P and closes the ring oil path 52Ph, and hence it is possible to restrict the flow of the oil in the communication passage L with a stable shape.

Subsequently, other modifications will be described.

In the embodiment described above, the description has been given by using the example in which the check valve mechanism 50 or the like is provided mainly in the bottom valve 40 or in the vicinity of the bottom valve 40. However, the position of disposition of the check valve mechanism 50 or the like is not limited to the above example. That is, the check valve mechanism may be appropriately provided on the outer side of the cylinder 11 or the area obtained by axially extending the cylinder 11 in the radial direction and may be appropriately positioned on the outer side of the course of the piston 30 or the area obtained by extending the course thereof so that the check valve mechanism may be provided, e.g., on the flow path of the oil in the communication passage L (in the oil).

Hereinbelow, examples in which the check valve mechanism is provided in the communication passage L will be described sequentially.

(Configuration and Function of Check Valve Mechanism 53 of Third Modification)

FIGS. 7A and 7B are views for explaining a check valve mechanism 53 of a third modification.

As shown in FIG. 7A, the check valve mechanism 53 of the third modification includes a holding piece 53P, a lift valve 53V, and a spring 53S.

The holding piece 53P is a cylindrical member, and is provided between the outer periphery of the cylinder 11 and the inner periphery of the outer cylindrical body 12. In addition, the holding piece 53P has a plurality of ring oil paths 53Ph in which the oil flows. Further, the holding piece 53P constitutes the path in which the oil flows in the communication passage L with the ring oil paths 53Ph.

The lift valve 53V is a disc-like member having an opening in the inside thereof. The inner diameter of the lift valve 53V is formed to be larger than the outer diameter of the cylinder 11, and the outer diameter thereof is formed to be smaller than the inner diameter of the outer cylindrical body 12. In addition, the lift valve 53V is provided so as to be movable in the axial direction between the cylinder 11 and the outer cylindrical body 12. Further, the lift valve 53V opposes the end of the holding piece 53P on the other side, and closes the ring oil path 53Ph while being in contact with the holding piece 53P.

The spring 53S is mounted so as to come in contact with the lift valve 53V in one of the expansion and contraction directions (the axial direction) and be hooked by the outer cylindrical body 12 in the other one of the expansion and contraction directions. In addition, the spring 53S pushes the lift valve 53V against the side of the other end of the ring oil path 53Ph of the holding piece 53P.

In the thus configured check valve mechanism 53 of the third modification, during the compression stroke, the movement of the lift valve 53V to the other side against the spring force of the spring 53S opens the ring oil path 53Ph, and the flow of the oil from the reservoir chamber R to the second oil chamber Y2 via the communication passage L is thereby permitted. On the other hand, during the extension stroke, the lift valve 53V closes the ring oil path 53Ph of the holding piece 53P, and the flow of the oil from the second oil chamber Y2 to the reservoir chamber R via the communication passage L is thereby restricted.

Note that, as shown in FIG. 7B, a check valve 53C may also be used. The check valve 53C is a disc-like member having an opening in the inside thereof, and can be deformed with resistance of the oil. The inner diameter of the check valve 53C is formed to be larger than the outer diameter of the cylinder 11. In addition, the check valve 53C is set to be larger than the inner diameter of the outer cylindrical body 12 and smaller than the outer diameter of the outer cylindrical body 12. That is, in a mounted state, the outer peripheral portion of the check valve 53C is sandwiched between the other end of the outer cylindrical body 12 and the other end of the holding piece 53P. In addition, the check valve 53C is configured to be deformable while the inner peripheral side thereof is not held, and the check valve 53C covers the other end of the ring oil path 53Ph while being in contact with the holding piece 53P. It is possible to control the flow of the oil to and from the reservoir chamber R via the communication passage L by opening and closing the ring oil path 53Ph using the check valve 53C.

In the check valve mechanism 53 of the third modification as well, the check valve 53C and the lift valve 53V are positioned on the outer side of the course of the piston 30 or the area obtained by extending the course thereof, and hence the long stroke length of the piston rod 20 is secured.

Herein, in the case where the check valve mechanism is provided in the member provided at the end on the other side where the oil seal 16 and the like are provided, it becomes necessary to perform complicated working, and the stroke length may be reduced correspondingly to the working. In contrast to this, in the check valve mechanism 53 of the third modification, it becomes possible to secure the stroke length of the piston rod 20 as described above without changing the configuration of the member provided at the end on the other side.

(Configuration and Function of Check Valve Mechanism 54 of Fourth Modification)

Figure 8A:
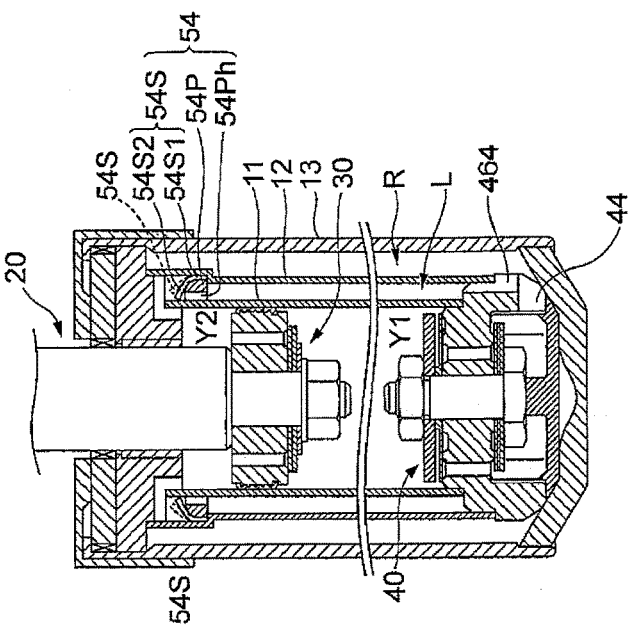
FIGS. 8A, 8B, and 8C are views for explaining a check valve mechanism of a fourth modification.
Figure 8B:
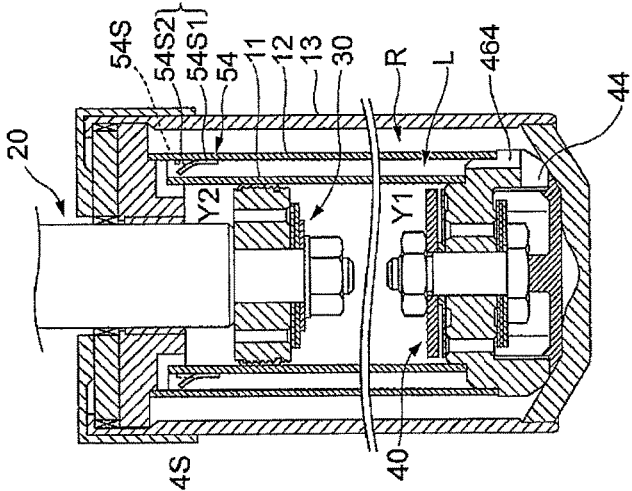
Figure 8C:
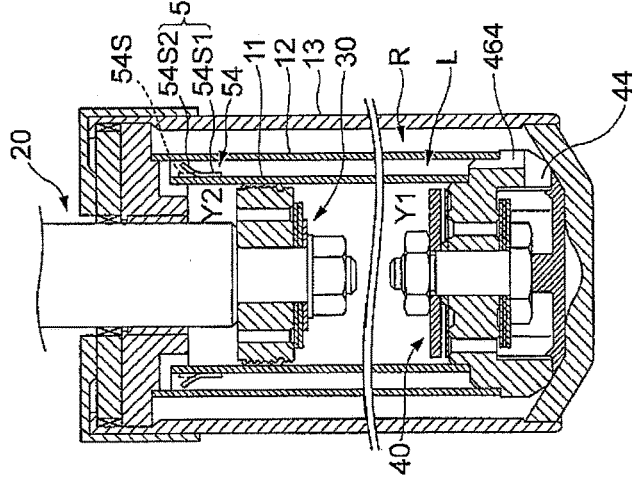

FIGS. 8A, 8B, and 8C are views for explaining a check valve mechanism 54 of a fourth modification.

As shown in FIG. 8A, the check valve mechanism 54 of the fourth modification has an oil seal 54S that is provided in the communication passage L. The oil seal 54S has a thin cylindrical shape, and is formed of a deformable material such as rubber or the like. The oil seal 54S is freely configured such that a connection portion 54S1 in the axial direction of the cylinder is adhered to the outer surface of the cylinder 11, and a deformation portion 54S2 can be deformed in accordance with the flow of the oil.

In the thus configured check valve mechanism 54 of the fourth modification, during the compression stroke, the deformation portion 54S2 approaches the outer periphery of the cylinder 11, and the flow of the oil from the reservoir chamber R to the second oil chamber Y2 is thereby permitted. On the other hand, during the extension stroke, the deformation portion 54S2 falls to the inner peripheral side of the outer cylindrical body 12 and comes into contact with the outer cylindrical body 12, and the flow of the oil from the second oil chamber Y2 to the reservoir chamber R is thereby restricted.

Note that, as shown in FIG. 8B, the oil seal 54S may also be provided on the inner periphery of the outer cylindrical body 12. That is, the oil seal 54S is freely configured such that the connection portion 54S1 is adhered to the inner periphery of the outer cylindrical body 12 and the deformation portion 54S2 can be deformed in accordance with the flow of the oil.

With this configuration as well, during the compression stroke, the deformation portion 54S2 approaches the inner periphery of the outer cylindrical body 12, and the flow of the oil from the reservoir chamber R to the second oil chamber Y2 is thereby permitted. On the other hand, during the extension stroke, the deformation portion 54S2 falls toward the outer periphery of the cylinder 11 and comes into contact with the cylinder 11, and the flow of the oil from the second oil chamber Y2 to the reservoir chamber R is thereby restricted.

Further, as shown in FIG. 8C, in order to cause the oil seal 54S to operate stably, a holding piece 54P may also be provided. The holding piece 54P is a member having a substantially thick cylindrical shape, is mounted to the inner periphery of the outer cylindrical body 12 with the oil seal 54S sandwiched between the holding piece 54P and the outer cylindrical body 12 on the outer peripheral side, and has a ring oil path 54Ph serving as the path in which the oil flows on the inner peripheral side.

In addition, as shown in FIG. 8C, the connection portion 54S1 of the oil seal 54S is held on the inner periphery of the outer cylindrical body 12 by the holding piece 54P. During the extension stroke, in the oil seal 54S, the connection portion 54S1 is supported by the holding piece 54P, and the deformation portion 54S2 comes in contact with the holding piece 54P along the holding piece 54P and closes the ring oil path 54Ph, and hence it is possible to restrict the flow of the oil in the communication passage L with a stable shape.

In the check valve mechanism 54 of the fourth modification as well, the oil seal 54S is positioned on the outer side of the course of the piston 30 or the extended area obtained by extending the course thereof, and hence the long stroke length of the piston rod 20 is secured.

(Configuration and Function of Check Valve Mechanism 55 of Fifth Modification)

Figure 9:
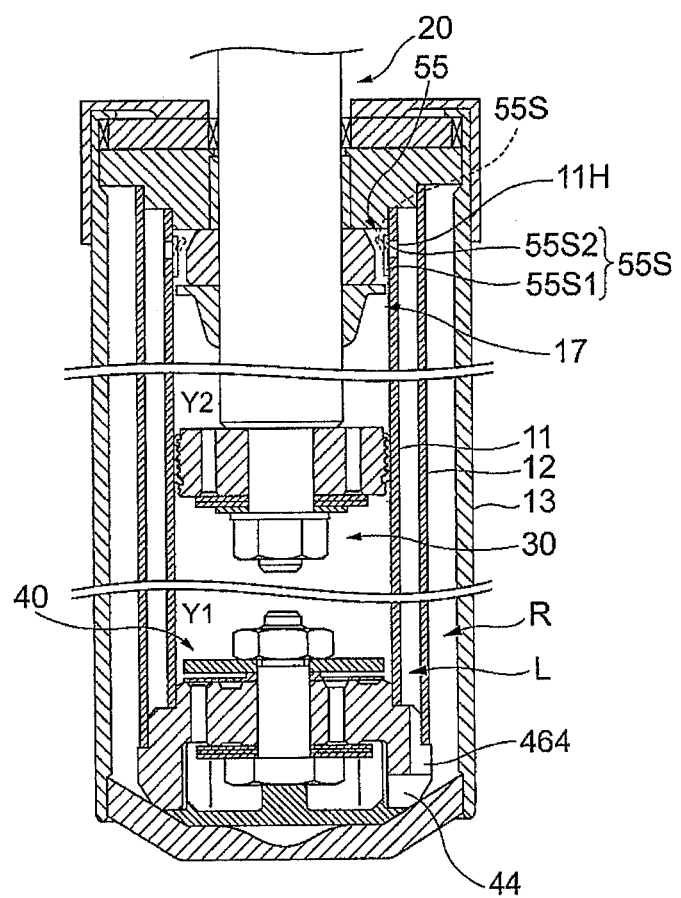
FIG. 9 is a view for explaining a check valve mechanism of a fifth modification.

FIG. 9 is a view for explaining a check valve mechanism 55 of a fifth modification.

As shown in FIG. 9, the cylinder 11 to which the check valve mechanism 55 of the firth modification is applied has the cylinder opening 11H that forms the flow path of the oil between the second oil chamber Y2 and the communication passage L.

The check valve mechanism 55 of the fifth modification includes an oil seal 55S. The oil seal 55S has a thin cylindrical shape, and is formed of a deformable material such as rubber or the like. The oil seal 55S is freely configured such that a connection portion 55S1 in the axial direction of the cylinder is adhered to the inner surface of the cylinder 11, and a deformation portion 55S2 can be deformed in accordance with the flow of the oil.

As shown in FIG. 9, in the movement range of the piston rod 20 restricted by the rebound stopper 17, the oil seal 55S is positioned on the outer side of the other side of the piston 30 in the axial direction when the piston rod 20 has moved to the end position on the extension side within the movement range of the piston rod 20 restricted by the rebound stopper 17. That is, the oil seal 55S is disposed in an area where the movement of the piston 30 in the cylinder 11 is physically restricted.

In the thus configured check valve mechanism 55 of the fifth modification, during the compression stroke, the connection portion 55S1 approaches the inner periphery of the cylinder 11, and the flow of the oil from the reservoir chamber R to the second oil chamber Y2 is thereby permitted. On the other hand, during the extension stroke, the deformation portion 55S2 falls to the outer peripheral side of the cylinder 11 and comes in contact with the cylinder 11, and the flow of the oil from the second oil chamber Y2 to the reservoir chamber R is restricted.

In addition, in the check valve mechanism 55 of the fifth modification, the oil seal 55S is positioned on the outer side of the course of the piston 30 in the axial direction, and is disposed in the area where the movement of the piston 30 in the cylinder 11 is physically restricted, and hence the long stroke length of the piston rod 20 is secured.

Note that, for example, the case where the check valve is not provided on one side of the piston 30 but the check valve for opening and closing the oil path is provided at the end on the other side is conceivable. In this case, there is provided the check valve mechanism that does not form the flow of the oil from the second oil chamber Y2 to the first oil chamber Y1 via the piston 30 during the extension stroke, and generates the flow of the oil from the first oil chamber Y1 to the second oil chamber Y2 via the piston 30 during the compression stroke. In this configuration as well, by disposing the check valve mechanism in the area where the movement of the piston 30 in the cylinder 11 is restricted, or on the outer side of the cylinder 11 and the area obtained by extending the cylinder 11 in the radial direction, it is possible to secure the long stroke length of the piston rod 20.

Figure 10:
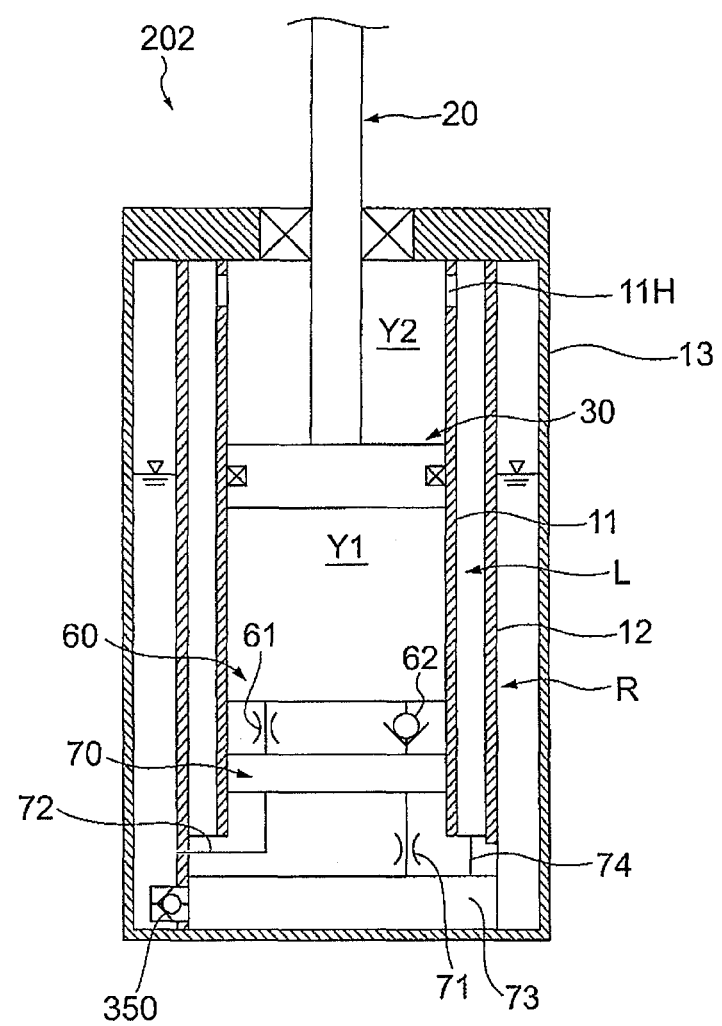
FIG. 10 is a conceptual view for explaining another hydraulic damping device.

FIG. 10 is a conceptual view for explaining another aspect of the hydraulic damping device.

As shown in FIG. 10, in a hydraulic damping device 202, the oil path and the check valve are not provided in the piston 30. In addition, the hydraulic damping device 202 has a first bottom member 60 and a second bottom member 70 on one side of the first oil chamber Y1.

The first bottom member 60 has a damping valve 61 and a check valve 62 that are provided in the oil paths. The damping valve 61 generates the damping force by narrowing the flow of the oil that gets in and out of the first oil chamber Y1. The check valve 62 permits the flow of the oil into the first oil chamber Y1 and restricts the flow of the oil getting out of the first oil chamber Y1.

In addition, the second bottom member 70 is provided closer to one end side than the first bottom member 60. The second bottom member 70 has a damping valve 71 provided in the oil path, a first communication passage 72 that allows the interior of the cylinder 11 and the reservoir chamber R to communicate with each other, and a second communication passage 74 that allows a space 73 formed at the end of the second bottom member 70 on one side and the communication passage L to communicate with each other.

As shown in FIG. 10, the hydraulic damping device 202 has a check valve mechanism 350 that controls the flow of the oil between the space 73 and the reservoir chamber R on, e.g., the outer periphery of the outer cylindrical body 12. The check valve mechanism 350 permits the flow of the oil from the reservoir chamber R to the second oil chamber Y2 via the communication passage L and the second communication passage 74, and restricts the flow of the oil from the second oil chamber Y2 to the reservoir chamber R via the communication passage L and the second communication passage 74. Note that an example of configuration of the check valve mechanism 350 includes a configuration in which the oil seal that covers the oil path formed in the cylinder 11 such that the oil path can be opened and closed is provided on the outer peripheral portion of the outer cylindrical body 12.

In the above configuration as well, by providing the check valve mechanism 350, which is provided at, e.g., the end of the second bottom member 70 in the axial direction in the conventional art, on the outer cylindrical body 12 in the present embodiment, the check valve mechanism 350 is disposed on the outer side of the cylinder 11 and the area obtained by extending the cylinder 11 in the radial direction. As a result, the long stroke length of the piston rod 20 is secured.

Note that, in the present embodiment, the oil chambers (the first oil chamber Y1 and the second oil chamber Y2), the reservoir chamber R, and the communication passage L are formed by using what is called a triple-tube structure constituted by the cylindrical shapes of the cylinder 11, the outer cylindrical body 12, and the damper case 13. However, instead of the triple-cylinder structure, a configuration may also be adopted in which the oil path between the first oil chamber Y1 and the second oil chamber Y2 is formed. In this case, a configuration in which the oil path is formed by coupling the first oil chamber Y1 and the second oil chamber Y2 to each other using a pipe member or the like is conceivable.

Further, in what is called a multi-cylinder type hydraulic damping device that includes the oil chamber and the reservoir chamber as well, the check valve mechanism for controlling the flow of the oil that flows between the reservoir chamber R and the oil chamber is disposed in the area where the movement of the piston 30 in the cylinder 11 is restricted or on the outer side of the cylinder 11 and the area obtained by extending the cylinder 11 in the radial direction. With this, at least the length corresponding to the axial length of the check valve mechanism is additionally secured as a part of the stroke length of the piston rod 20.

What is claimed is:

1. A pressure damping device comprising:
a first cylinder containing a liquid;
a second cylinder positioned outside the first cylinder and forming a liquid reservoir chamber in which the liquid collects between the second cylinder and the first cylinder;
a partition member provided in the first cylinder so as to be movable in an axial direction and partitioning an interior of the first cylinder into a first liquid chamber and a second liquid chamber that contain the liquid in the interior of the first cylinder;
a rod member connected to the partition member and moving in the axial direction of the first cylinder;
an outer flow path forming a flow path of the liquid between the first liquid chamber and the liquid reservoir chamber outside the first cylinder;
a partition communication member separating the interior of the first cylinder from the liquid reservoir chamber and having a communication passage of the liquid between the interior of the first cylinder and the liquid reservoir chamber;
a permission restriction portion disposed radially outside of either an area of the first cylinder where movement of the partition member is restricted, or an area obtained by axially extending the area of the first cylinder, provided at a contacting position with the outer flow path of the partition communication member, and permitting a flow in one direction between the interior of the first cylinder and the liquid reservoir chamber caused by the movement of the partition member, while restricting a flow in the other direction; and
a third cylinder provided between the first cylinder and the second cylinder, forming the outer flow path between the third cylinder and the first cylinder, and forming the liquid reservoir chamber between the third cylinder and the second cylinder, wherein
the third cylinder has an enlarged diameter portion of which an inner diameter is larger than that of another portion of the third cylinder, and
the permission restriction portion is provided between the first cylinder and the third cylinder so as to be movable in the axial direction in a portion radially surrounded by an inner periphery of the enlarged diameter portion and an outer periphery the first cylinder.

2. The pressure damping device according to claim 1, wherein
the partition communication member further has a liquid reservoir portion communication passage that forms a flow path of the liquid between the outer flow path and the liquid reservoir chamber, and
the permission restriction portion is provided in the liquid reservoir portion communication passage, and permits and restricts the flow of the liquid between the interior of the first cylinder and the liquid reservoir chamber via the outer flow path.

3. The pressure damping device according to claim 1, wherein
the permission restriction portion is provided in the outer flow path, and permits and restricts a flow of the liquid between the interior of the first cylinder and the liquid reservoir chamber via the outer flow path.

4. The pressure damping device according to claim 2, wherein
the partition member has an inter-liquid chamber communication passage that forms a flow path of the liquid between the first liquid chamber and the second liquid chamber, and a partition member restriction permission member that permits a flow of the liquid from the second liquid chamber to the first liquid chamber via the inter-liquid chamber communication passage and restricts a flow of the liquid from the first liquid chamber to the second liquid chamber,
the permission restriction portion is configured by an elastic mechanism having an elastic body that receives the flow of the liquid and is thereby elastically deformed or a movable body that is moved by an elastic body that receives the flow of the liquid and is thereby elastically deformed, and
the elastic mechanism permits a flow of the liquid from the liquid reservoir chamber to the second liquid chamber via the outer flow path by opening the liquid reservoir portion communication passage in conjunction with movement of the partition member toward the first liquid chamber, and restricts a flow of the liquid from the second liquid chamber to the liquid reservoir chamber via the outer flow path by closing the liquid reservoir portion communication passage in conjunction with movement of the partition member toward the second liquid chamber.

5. The pressure damping device according to claim 1, wherein a radial distance to the first cylinder at the enlarged diameter portion is greater than that at the other portion.

6. The pressure damping device according to claim 1, the permission restriction portion is configured to permit a flow in one direction between the first cylinder chamber and the liquid reservoir chamber.

7. The pressure damping device according to claim 1, wherein the inner diameter of the enlarged diameter portion is larger than an inner diameter of any other portions of the third cylinder.

* * * * *